(12) United States Patent
Seo et al.

(10) Patent No.: US 8,199,234 B2
(45) Date of Patent: Jun. 12, 2012

(54) APPARATUS AND METHOD FOR CORRECTING BACKLIGHT OF CAMERA

(75) Inventors: Sungha Seo, Pyeongtaek-si (KR); Namkyu Ahn, Pyeongtaek-si (KR); Chol Min, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 1015 days.

(21) Appl. No.: 12/166,097

(22) Filed: Jul. 1, 2008

(65) Prior Publication Data

US 2009/0213244 A1    Aug. 27, 2009

(30) Foreign Application Priority Data

Feb. 25, 2008 (KR) .................. 10-2008-0016957

(51) Int. Cl.
*H04N 5/235* (2006.01)
(52) U.S. Cl. .................. 348/297; 348/362; 396/335
(58) Field of Classification Search .................. 348/297, 348/362
See application file for complete search history.

(56) References Cited

U.S. PATENT DOCUMENTS

| | | | |
|---|---|---|---|
| 5,420,635 A | 5/1995 | Konishi et al. | |
| 6,147,706 A | 11/2000 | Inuiya et al. | |
| 6,219,097 B1 * | 4/2001 | Kamishima et al. | 348/297 |
| 7,042,509 B2 * | 5/2006 | Onuki | 348/362 |
| 7,126,635 B1 | 10/2006 | Oochi | |
| 7,450,782 B2 | 11/2008 | Lim et al. | |
| 7,466,358 B1 * | 12/2008 | Kusaka et al. | 348/362 |
| 7,511,739 B2 * | 3/2009 | Tsujino | 348/229.1 |
| 2005/0046708 A1 | 3/2005 | Lim et al. | |
| 2006/0170790 A1 * | 8/2006 | Turley et al. | 348/229.1 |

FOREIGN PATENT DOCUMENTS

| | | |
|---|---|---|
| EP | 0977432 A2 | 2/2000 |
| JP | 5-64075 A | 3/1993 |
| JP | 2007-288805 A | 11/2007 |
| KR | 1020050022748 A | 3/2005 |

* cited by examiner

*Primary Examiner* — Clayton E Laballe
*Assistant Examiner* — Leon W. Rhodes, Jr.
(74) *Attorney, Agent, or Firm* — Birch, Stewart, Kolasch & Birch, LLP

(57) ABSTRACT

An apparatus and method for correcting the backlight of a camera are disclosed. When the camera for photographing a moving image by a photographing device, such as a general-purpose CCD or a general-purpose CMOS, enters into a backlight shooting state for simultaneously photographing an object with a very high luminance level and an object with a very low luminance level, as the shutter speed of the photographing device is varied to a long shutter speed and a short shutter speed, an image shot with the long shutter speed and an image shot with the short shutter speed are synthesized and outputted, thereby enabling a proper luminance level object photographing operation for each of the objects. Accordingly, it is possible to efficiently prevent the phenomenon that the object with the low luminance level looks dark due to the object with the high luminance level.

34 Claims, 6 Drawing Sheets

APPARATUS AND METHOD FOR CORRECTING BACKLIGHT OF CAMERA

CROSS REFERENCE TO RELATED APPLICATIONS

This nonprovisional application claims priority under 35 U.S.C. §119(a) on Patent Application No. 10-2008-0016957 filed in Republic of Korea on Feb. 25, 2008 the entire contents of which are hereby incorporated by reference.

BACKGROUND OF THE INVENTION

1. Field of the Invention

This document relates to an apparatus, computer program product and method for correcting the backlight of a camera, and more particularly, to an apparatus, computer program product and method for correcting the backlight of a camera, which can photograph a moving image by using a photographing device such as a CCD (charge coupled device) or a CMOS (complementary metal oxide semiconductor).

2. Discussion of the Related Art

Photographing devices, such as a CCD or CMOS are widely used for a camera for photographing a moving image. When photographing an object with a high luminance level, in order to reduce the amount of light incident on the photographing device, a conventional camera automatically reduces the opening amount of an iris or automatically reduces an analog gain value for amplifying an output signal of the photographing device.

Further, even with the opening amount of the iris and the analog gain value automatically reduced, if it is impossible to photograph an object with a proper luminance level, the camera adjusts the shutter speed of the photographing device to a short shutter speed in order to reduce the charge amount to be charged by each of the pixels of the photographing device.

In addition, in order to increase the amount of light incident on the photographing device, the conventional camera automatically increases the opening amount of the iris or automatically increases the analog gain value for amplifying an output signal of the photographing device.

Furthermore, even after opening the iris and automatically increasing the analog gain value, if it is impossible to photograph an object with a proper luminance level, the camera adjusts the shutter speed of the photographing device to a long shutter speed in order to increase the charge amount to be charged by each of the pixels of the photographing device.

Thus, in case of photographing an object with a high luminance level or an object with a low luminance level, the conventional camera can perform an appropriate level object photographing operation by automatically adjusting the opening amount of the iris, the analog gain value, and the shutter speed.

However, when the conventional camera goes into a backlight shooting state for simultaneously photographing, for example, an object with a very high luminance level and an object with a very low luminance level during a moving image photographing operation, the conventional camera cannot perform a proper luminance level object photographing operation for each of the objects.

SUMMARY

The present invention has been made in an effort to provide an apparatus, computer program product and method for correcting a backlight of a camera, wherein, even if the camera for photographing a moving image by a photographing device, such as a general-purpose CCD or a general-purpose CMOS, enters into a backlight shooting state for simultaneously photographing an object with a very high luminance level and an object with a very low luminance level, a proper luminance level object photographing operation for each of the objects can be performed.

To achieve the above advantages, in one aspect, the present invention provides a device, computer program product and method for correcting the backlight of a camera, comprising: varying the shutter speed of a photographing device to a long shutter speed and a short shutter speed in a backlight shooting mode; and synthesizing an image shot with the long shutter speed with an image shot with the short shutter speed and outputting the same.

In one embodiment, the shutter speed of the photographing device is varied in the backlight shooting mode so that the long shutter speed and the short shutter speed can be performed at least once in a cycle of one field.

In the outputting, the digital gain up operation is performed for the image shot with the long shutter speed and the digital gain down operation is performed for the image shot with the short shutter speed, and then the respective images are synthesized and outputted.

The digital gain up operation and the digital gain down operation are selectively performed according to a user's request, and the photographing device is a general CCD or general CMOS that is used to photograph a moving image.

In another aspect, the present invention provides a method for correcting the backlight of a camera, comprising: varying the shutter speed of a photographing device in a backlight shooting mode so that a long shutter speed and a short shutter speed can be performed once respectively in a cycle of one field, the short shutter speed being performed at the starting portion of the corresponding field; and performing a digital gain up operation for an image shot with the long shutter speed and a digital gain down operation for an image shot with the short shutter speed, and then synthesizing the respective images and outputting the same.

In the outputting, the image of the short shutter speed performed at the starting portion of the corresponding field is synthesized with the image of the long shutter speed performed in the previous field.

The digital gain up operation and the digital gain down operation are selectively performed according to a user's request, and the photographing device is a general CCD or general CMOS that is used to photograph a moving image.

In another aspect, the present invention provides a method for correcting the backlight of a camera, comprising: varying the shutter speed of a photographing device in a backlight shooting mode so that a long shutter speed and a short shutter speed can be performed once respectively in a cycle of one field, the short shutter speed being performed at the end portion of the corresponding field; and performing a digital gain up operation for an image shot with the long shutter speed and a digital gain down operation for an image shot with the short shutter speed, and then synthesizing the respective images and outputting the same.

In the outputting, the image of the short shutter speed performed at the end portion of the corresponding field is synthesized with the image of the long shutter speed performed in the next field.

The digital gain up operation and the digital gain down operation are selectively performed according to a user's request, and the photographing device is a general CCD or general CMOS that is used to photograph a moving image.

In another aspect, the present invention provides a method for correcting the backlight of a camera, comprising: varying the shutter speed of a photographing device in a backlight shooting mode so that a long shutter speed and a short shutter speed can be performed once and twice respectively in a cycle of one field; and performing a digital gain up operation for an image shot with the long shutter speed and a digital gain down operation for an image shot with the short shutter speed, and then synthesizing the respective images and outputting the same.

The short shutter speed is performed once respectively at the starting and end portions of the corresponding field. In the outputting, the digital gain up operation is performed for the image shot with the long shutter speed and the digital gain down operation is performed for the image shot with the short shutter speed of the starting portion and then the respective images are synthesized and outputted, while the digital gain down operation is performed for the image shot with the short shutter speed of the end portion and the digital gain up operation is performed for the image shot with the long shutter speed and then the respective images are synthesized and outputted.

The digital gain up operation and the digital gain down operation are selectively performed according to a user's request, and the photographing device is a general CCD or general CMOS that is used to photograph a moving image.

In another aspect, the present invention provides an apparatus for correcting the backlight of a camera, comprising: a control means for varying the shutter speed of a photographing device to a long shutter speed and a short shutter speed in a backlight shooting mode; and a signal processing means for synthesizing an image shot with the long shutter speed with an image shot with the short shutter speed and outputting the same.

The control means varies the shutter speed of the photographing device in the backlight shooting mode so that the long shutter speed and the short shutter speed can be performed at least once in a cycle of one field.

The signal processing means performs the digital gain up operation for the image shot with the long shutter speed and the digital gain down operation for the image shot with the short shutter speed, and then synthesizes the respective images and outputs the same.

The digital gain up operation and the digital gain down operation are selectively performed according to a user's request, and the photographing device is a general CCD or general CMOS that is used to photograph a moving image.

In another aspect, the present invention provides an apparatus for correcting the backlight of a camera, comprising: a control means for varying the shutter speed of a photographing device in a backlight shooting mode so that a long shutter speed and a short shutter speed can be performed once respectively in a cycle of one field, the short shutter speed being performed at the starting portion of the corresponding field; and a signal processing means for performing a digital gain up operation for an image shot with the long shutter speed and a digital gain down operation for an image shot with the short shutter speed, and then synthesizing the respective images and outputting the same.

The signal processing means synthesizes the image of the short shutter speed performed at the starting portion of the corresponding field with the image of the long shutter speed performed in the previous field.

The digital gain up operation and the digital gain down operation are selectively performed according to a user's request, and the photographing device is a general CCD or general CMOS that is used to photograph a moving image.

In another aspect, the present invention provides an apparatus for correcting the backlight of a camera, comprising: a control means for varying the shutter speed of a photographing device in a backlight shooting mode so that a long shutter speed and a short shutter speed can be performed once respectively in a cycle of one field, the short shutter speed being performed at the end portion of the corresponding field; and a signal processing means for performing a digital gain up operation for an image shot with the long shutter speed and a digital gain down operation for an image shot with the short shutter speed, and then synthesizing the respective images and outputting the same.

The signal processing means synthesizes the image of the short shutter speed performed at the end portion of the corresponding field with the image of the long shutter speed performed in the next field.

The digital gain up operation and the digital gain down operation are selectively performed according to a user's request, and the photographing device is a general CCD or general CMOS that is used to photograph a moving image.

In another aspect, the present invention provides an apparatus for correcting the backlight of a camera, comprising: a control means for varying the shutter speed of a photographing device in a backlight shooting mode so that a long shutter speed and a short shutter speed can be performed once and twice respectively in a cycle of one field; and a signal processing means for performing a digital gain up operation for an image shot with the long shutter speed and a digital gain down operation for an image shot with the short shutter speed, and then synthesizing the respective images and outputting the same.

The short shutter speed is performed once respectively at the starting and end portions of the corresponding field. The signal processing means performs the digital gain up operation for the image shot with the long shutter speed and the digital gain down operation for the image shot with the short shutter speed of the starting portion and then synthesizes the respective images and outputs the same, while the signal processing means performs the digital gain down operation for the image shot with the short shutter speed of the end portion and the digital gain up operation for the image shot with the long shutter speed and then synthesizes the respective images and outputs the same.

The digital gain up operation and the digital gain down operation are selectively performed according to a user's request, and the photographing device is a general CCD or general CMOS that is used to photograph a moving image.

In the apparatus, computer program product and method for correcting the backlight of a camera, when the camera enters into a backlight shooting state for simultaneously photographing an object with a very high luminance level and an object with a very low luminance level, as the shutter speed of the photographing device is changed to a long shutter speed and a short shutter speed, an image shot with the long shutter speed and an image shot with the short shutter speed are synthesized and outputted, thereby enabling a proper luminance level object photographing operation for each of the objects. Accordingly, it is possible to efficiently prevent the phenomenon that the object with the low luminance level has a dark due compared with the object with the high luminance level.

BRIEF DESCRIPTION OF THE DRAWINGS

The implementation of this document will be described in detail with reference to the following drawings in which like numerals refer to like elements.

DETAILED DESCRIPTION

Hereinafter, an implementation of this document will be described in detail with reference to the attached drawings.

First, the apparatus and method for correcting the backlight of a camera according to the present invention is applied to various types of cameras, for example, a monitoring camera or the like provided with a photographing device, such as a typical general-purpose CCD or CMOS that is widely used to photograph a moving image.

Figure 1:
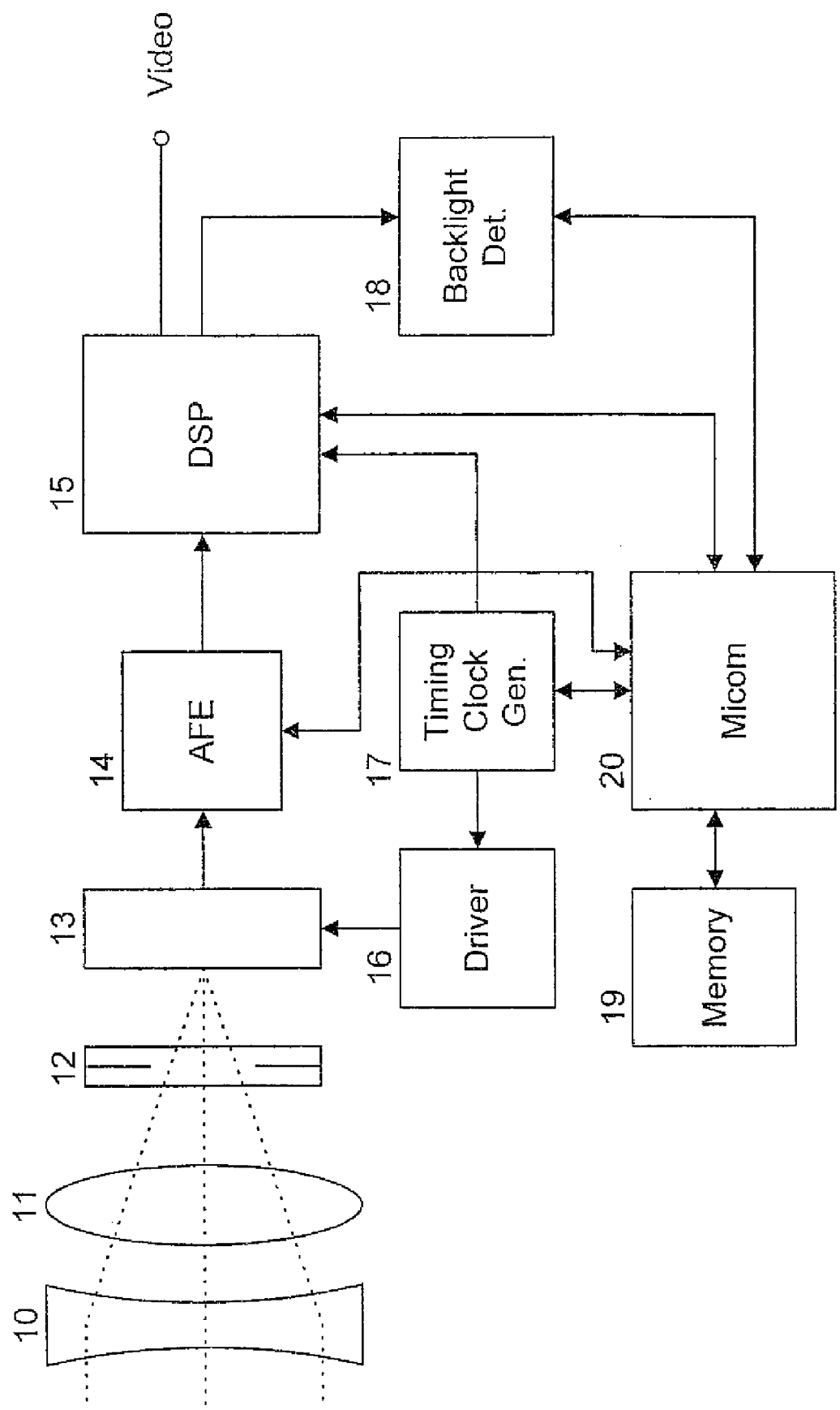
FIG. 1 illustrates the construction of a camera to which the present invention is applied.

FIG. 1 illustrates the construction of a camera to which the present invention is applied. The camera comprises a zoom lens 10, a focus lens 11, an iris 12, a photographing device 13, an analog front end (AFE) 14, a digital signal processor 15, a driver 16, a timing clock generator 17, a backlight detector 18, a memory 19, a microcomputer 2, and so on.

Figure 2:
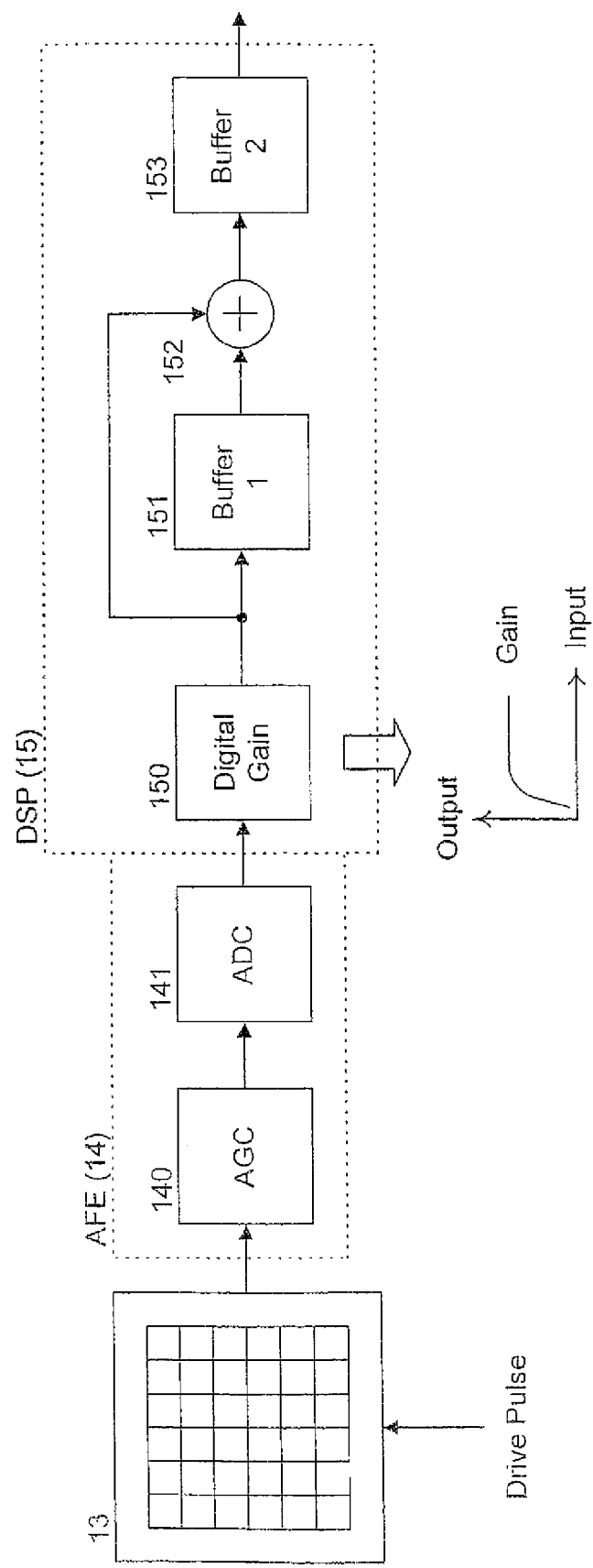
FIG. 2 illustrates a partial construction of a camera to which the present invention is applied.

As shown in FIG. 2, for example, the analog front end 14 comprises an automatic gain controller AGC 140 and an A/D converter 141, and the digital signal processor 15 comprises a digital gain controller 150, a first buffer 151, a synthesizer 152, and a second buffer 153.

The photographing device 13 converts light incident through the zoom lens 10, focus lens 11, and iris 12 into an analog electrical signal for each pixel and outputs it.

The analog front end 14 performs an auto gain control (ACG) operation such that the analog electrical signal is more than a predetermined level, and then performs an analog signal processing operation for converting the analog electrical signal into a digital signal and outputting it. The digital signal processor 15 performs a digital signal processing operation for converting the digital signal into video data and outputting the video data.

The backlight detector 18 detects the presence of a backlight shooting state by analyzing the video data. For instance, if an object with a very high luminance level and an object with a very low luminance level are both present within video data of one image, a backlight shooting state is detected.

The microcomputer 20 sets a backlight shooting mode according to a detection signal outputted from the backlight detector 18. For instance, the backlight detector 18 may be comprised of software or the like within the digital signal processor 15 or microcomputer 20.

When the backlight shooting mode is set as above, the microcomputer 20 operatively controls the timing clock generator 17 to vary a timing clock pulse applied to the driver 16, thereby varying the shutter speed of the photographing device 13 driven by the driver 16 to a long shutter speed and a short shutter speed.

Further, the microcomputer 20 selectively controls the digital gain controller 150 included in the digital signal processor according to a user's selection to thus perform a digital gain increase operation for an image shot with the long shutter speed and a digital gain reduction operation for an image shot with the short shutter speed.

Figure 3:
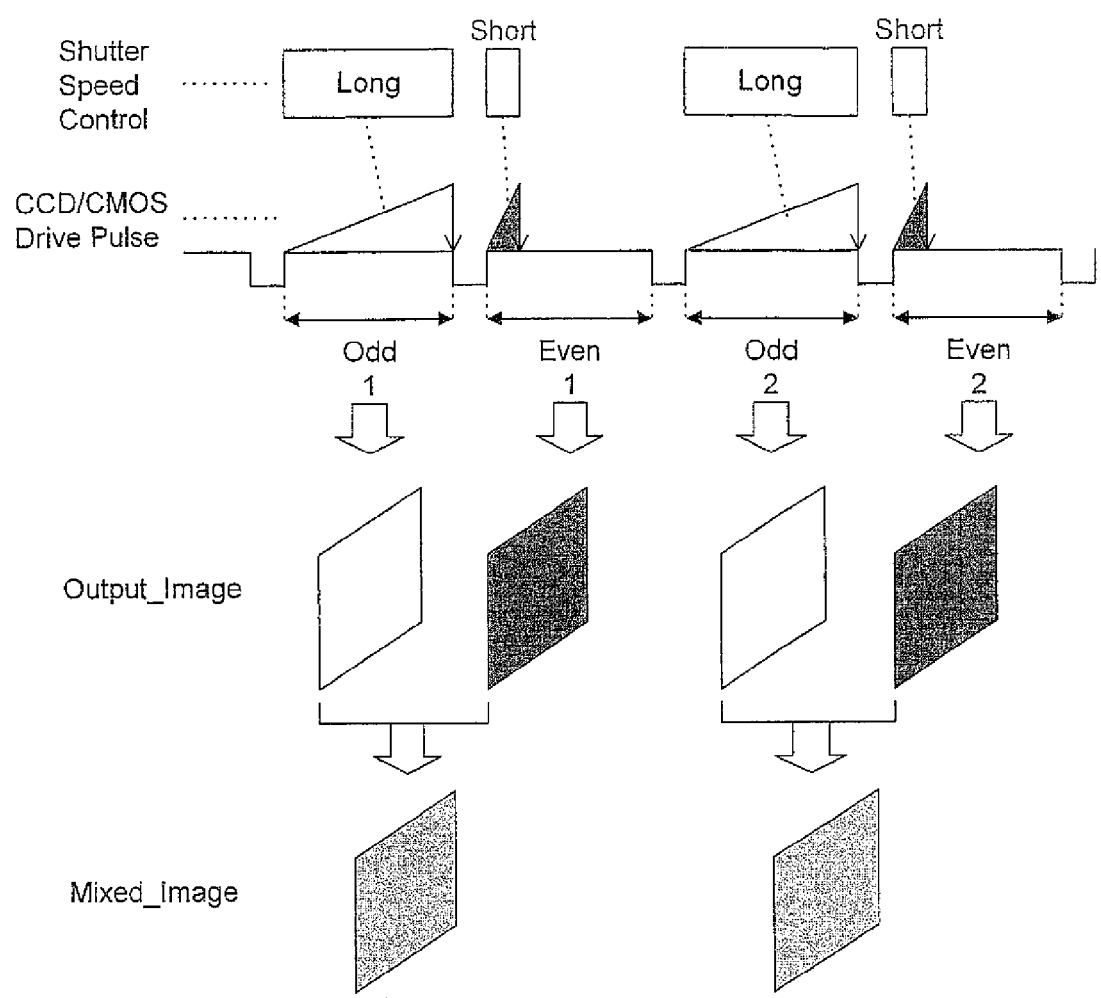
FIG. 3 illustrates an embodiment of a method for correcting the backlight of a camera according to the present invention.

The digital signal processor 15 synthesizes the respective images and outputs them. For instance, as shown in FIG. 3, when the backlight shooting mode is set, the microcomputer 20 operatively controls the timing clock generator 17 to thus variably control a driving pulse (e.g., CCD/CMOS Drive Pulse) applied to the driver 16.

The shutter speed of the photographing device 13 is varied between a long shutter speed and a short shutter speed in one field cycle. For instance, as shown in FIG. 3, in a first odd-numbered (Odd 1) field, the long shutter speed is applied so that an object with a very low luminance level can be photographed as an object image with a low luminance level.

Also, the microcomputer 20 operatively controls the digital gain controller 150 to perform a digital gain increase operation for the object image with the low luminance level. Hence, the object image with the low luminance level is converted into an object image with a proper luminance level and stored in the first buffer 151.

In a first even-numbered (Even 1) field, the short shutter speed is applied to the starting portion of the corresponding field so that an object with a very high luminance level can be photographed as an object image with a high luminance level. Thereafter, the digital gain controller 150 is operatively controlled to perform a digital gain reduction operation for the object image with the high luminance level. Hence, the object image with the high luminance level is converted into an object image with a proper luminance level.

The first even-numbered (Even 1) object image converted through the above series of processes is synthesized with the first odd-numbered (Odd 1) object image stored in the first buffer 151. Hence, an object image with a proper luminance level obtained by synthesizing the first odd-numbered (Odd 1) object image and the first even-numbered (Even 1) object image is outputted through the second buffer 153.

In a second odd-numbered (Odd 1) field, the long shutter speed is applied so that an object with a very low luminance level can be photographed as an object image with a low luminance level. Thereafter, the digital gain controller 150 is operatively controlled to perform a digital gain increase operation for the object image with the low luminance level. Hence, the object image with the low luminance level is converted into an object image with a proper luminance level.

Since the object image of the second odd-numbered (Odd 2) field has low correlation with the object image shot at the starting portion of the first even-numbered (Even 1) field, the microcomputer 20 automatically clears the first buffer 151, and then temporarily stores the object image of the second odd-numbered (Odd 2) field in the first buffer 151.

In a second even-numbered (Even 2) field, the short shutter speed is applied to the starting portion of the corresponding field so that an object with a very high luminance level can be photographed as an object image with a high luminance level. Thereafter, the digital gain controller 150 is operatively controlled to perform a digital gain reduction operation for the object image with the high luminance level. Hence, the object image with the high luminance level is converted into an object image with a proper luminance level.

The second even-numbered (Even 2) object image converted through the above series of processes is synthesized with the second odd-numbered (Odd 2) object image stored in the first buffer 151. Hence, an object image with a proper luminance level obtained by synthesizing the second odd-numbered (Odd 2) object image and the second even-numbered (Even 2) object image is outputted through the second buffer 153.

The second buffer 153 outputs the temporarily stored object image with the proper luminance level twice in series for each field, thus preventing the outputting of a moving object image from stopping.

Figure 4:
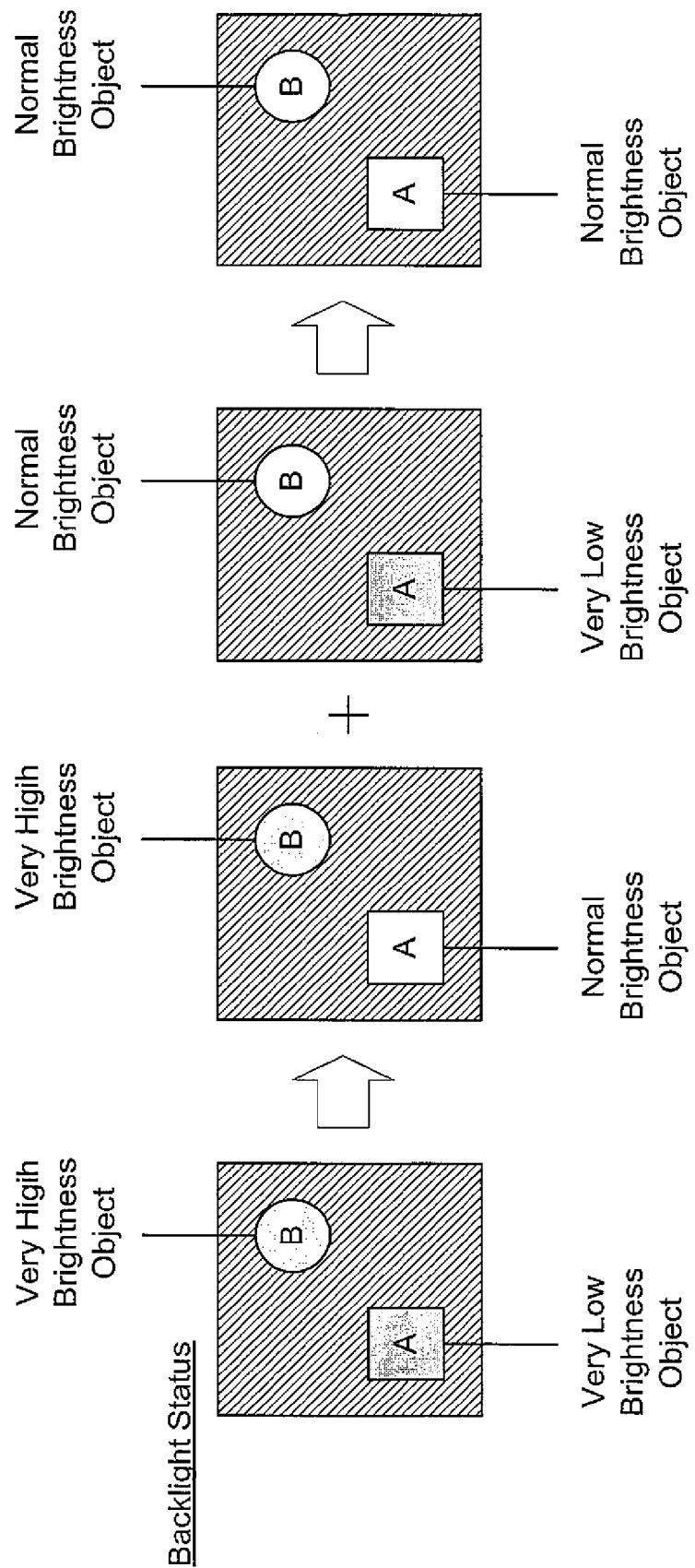
FIG. 4 illustrates a process for correcting the backlight of a camera according to the present invention.

Subsequently, in the backlight shooting mode, for example, as shown in FIG. 4, even if an object with a very high luminance level and an object with a very low luminance level are simultaneously photographed, in an odd-numbered field, a long shutter speed is applied and a digital gain increase control operation is performed to thus convert an object image with a very low luminance level into an object image with a proper luminance level, while in an even-numbered field, a short shutter speed is applied and a digital gain reduction control operation is performed to thus convert an object image with a very high luminance level into an object image with a proper luminance level. Thereafter, the respective images are synthesized to output an object image with a proper luminance level.

Figure 5:
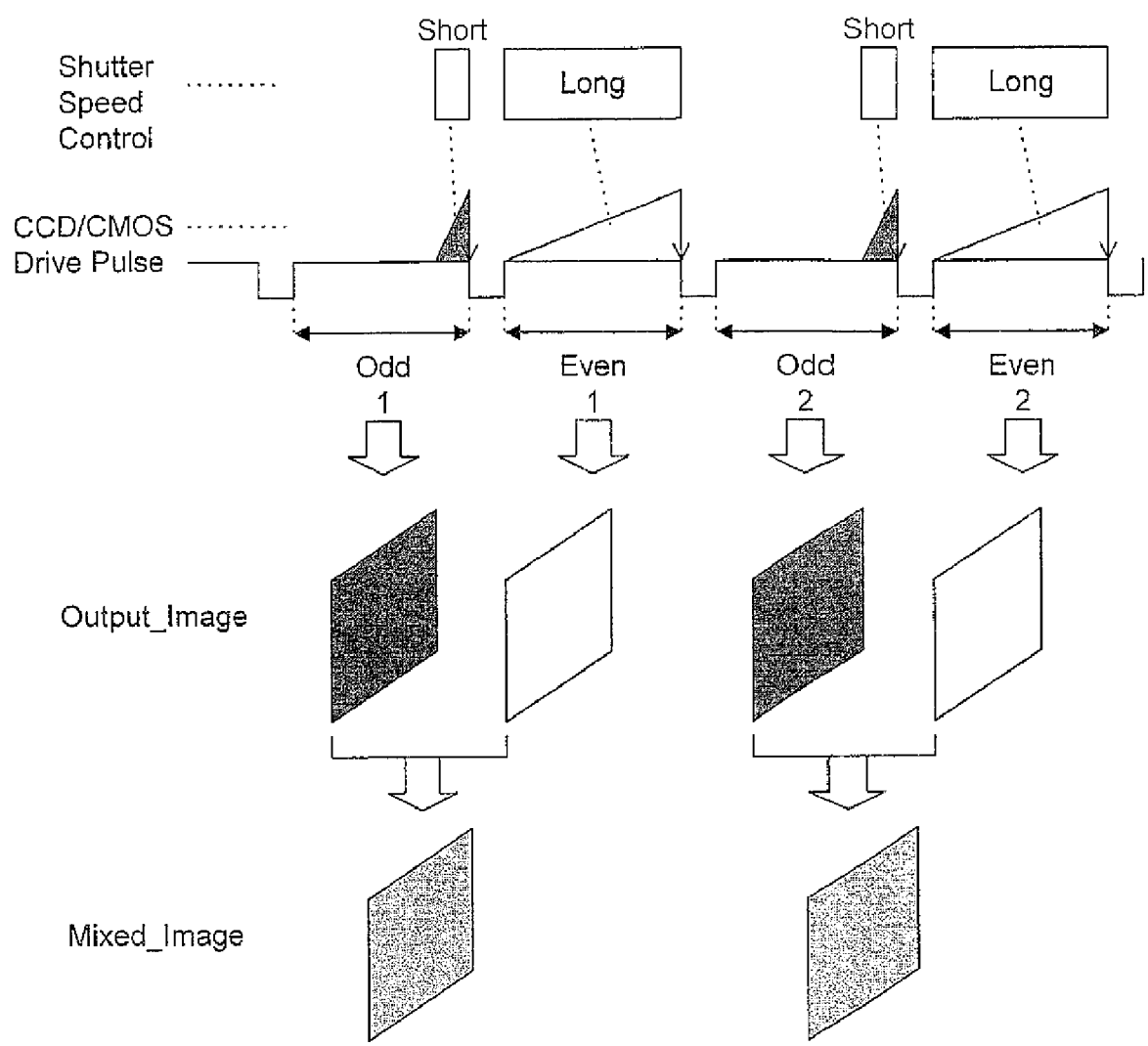
FIG. 5 illustrates another embodiment of a method for correcting the backlight of a camera according to the present invention.

FIG. 5 illustrates another embodiment of a method for correcting the backlight of a camera according to the present invention. For instance, the microcomputer 20 operatively controls the timing clock generator 17 to apply a short shutter speed to an odd-numbered field (Odd 1, 2, . . . ) and apply a long shutter speed to an even-numbered field (Even 1, 2, . . . ).

For example, as shown in FIG. 5, in a case where the short shutter speed is applied to an odd-numbered field, the microcomputer 20 allows the short shutter speed to be performed at the end portion of each odd-numbered field such that an object image shot with the short shutter speed and an object image shot with the long shutter speed can have correlation with each other.

Also, the microcomputer 20 operatively controls the digital gain controller 150 to perform a digital gain reduction operation for an object image with a high luminance level shot with the short shutter speed and a digital gain increase operation for an object image with a low luminance level shot with the long shutter speed.

Subsequently, in the odd-numbered field, a short shutter speed is applied and a digital gain reduction control operation is performed to thus convert an object image with a very high luminance level into an object image with a proper luminance level, while in the even-numbered field, a long shutter speed is applied and a digital gain increase control operation is performed to thus convert an object image with a very low luminance level into an object image with a proper luminance level. Thereafter, the respective images are synthesized to output an object image with a proper luminance level.

Figure 6:
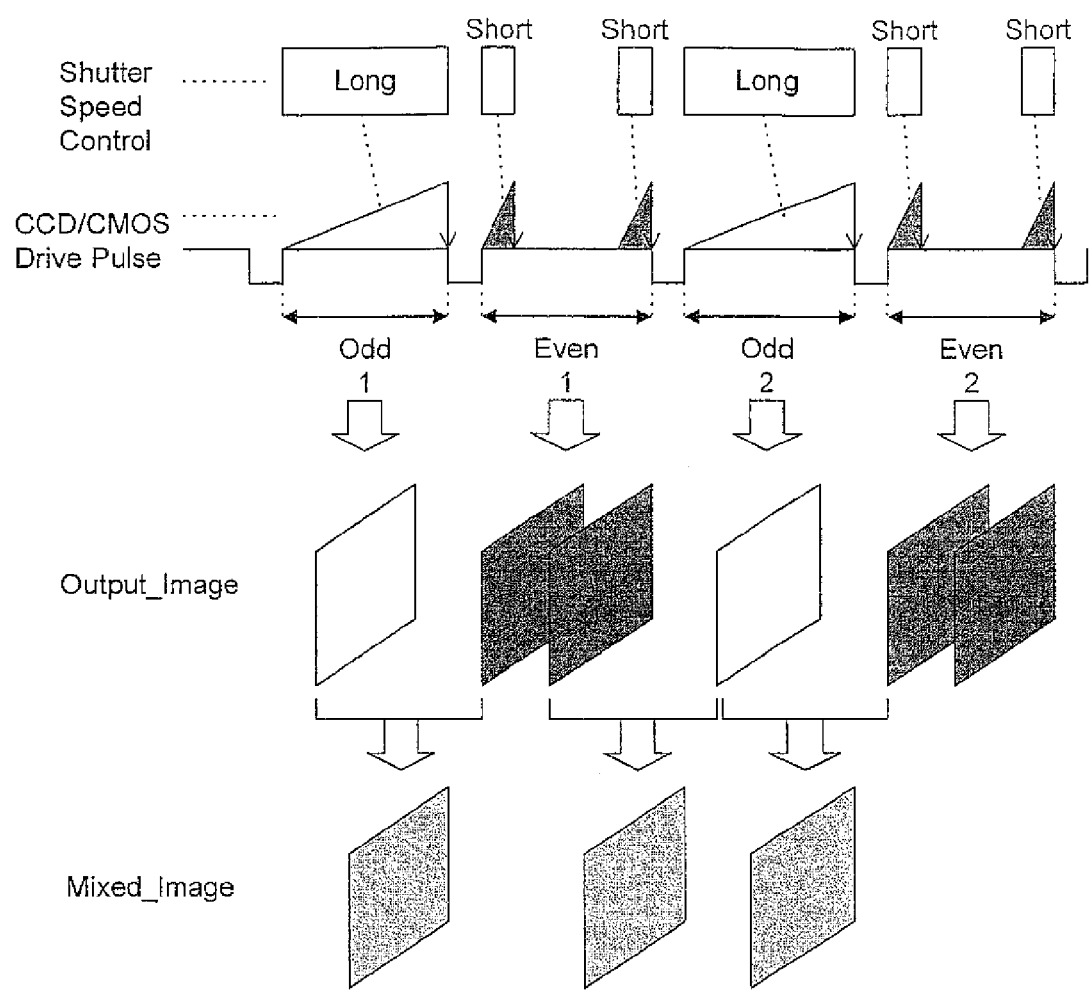
FIG. 6 illustrates still another embodiment of a method for correcting the backlight of a camera according to the present invention.

FIG. 6 illustrates still another embodiment of a method for correcting the backlight of a camera according to the present invention. For instance, the microcomputer 20 operatively controls the timing clock generator 17 to apply a long shutter speed to an odd-numbered field (Odd 1, 2, . . . ) and apply a short shutter speed twice to an even-numbered field (Even 1, 2, . . . ).

For example, as shown in FIG. 6, in a case where the short shutter speed is applied to an even-numbered field, the microcomputer 20 allows the short shutter speed to be performed once respectively at the starting and end portions of each even-numbered field such that an object image shot with the short shutter speed and an object image shot with the long shutter speed can have correlation with each other.

Also, the microcomputer 20 operatively controls the digital gain controller 150 to perform a digital gain reduction operation for an object image with a high luminance level shot with the short shutter speed and a digital gain increase operation for an object image with a low luminance level shot with the long shutter speed.

Subsequently, an object image, converted into a proper luminance level by applying a short shutter speed at the starting portion of the even-numbered field and performing a digital gain reduction control operation, and an object image, converted into a proper luminance level by applying a long shutter speed in the previous odd-numbered field and performing a digital gain increase control operation, are synthesized to output an object image with a proper luminance level.

Also, an object image, converted into a proper luminance level by applying a short shutter speed at the end portion of the even-numbered field and performing a digital gain reduction control operation, and an object image, converted into a proper luminance level by applying a long shutter speed in the next odd-numbered field and performing a digital gain increase control operation, are synthesized to output an object image with a proper luminance level.

As a result, even if a camera using a photographing device, such as a general-purpose CCD or general-purpose CMOS that is widely used to photograph a moving image enters into a backlight shooting state, both of an object with a high luminance level and an object with a low luminance level can be photographed as an object image with a proper luminance level.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The above-described preferred embodiments of the present invention are disclosed for illustrative purposes. Those skilled in the art can achieve modifications, variations, substitutions or additions associated with various other embodiments within the spirit and technical scope of the present invention disclosed in the accompanying claims.

What is claimed is:

1. A method for correcting the backlight of a camera having a shutter configured to operate in a backlight shooting mode, comprising:
 varying a speed of the shutter between a long shutter speed and a short shutter speed;
 synthesizing an image shot with the long shutter speed with an image shot with the short shutter speed to produce a final image by increasing a digital gain on the image shot with the long shutter speed and reducing a digital gain on the image shot with the short shutter speed; and
 outputting the final image.

2. The method according to claim 1, the step of varying comprising:
varying the shutter speed so that the long shutter speed image and the short shutter speed image are shot at least once in a cycle of one field.

3. The method according to claim 1, wherein the steps of increasing and reducing are selectively performed in response to a user input.

4. The method according to claim 1, wherein the camera comprises a CCD or a CMOS device.

5. A method for correcting the backlight of a camera having a shutter configured to operate in a backlight shooting mode, comprising:
varying a speed of the shutter over a plurality of fields so that a long shutter speed operation and a short shutter speed operation are performed once respectively per field, the short shutter speed operation being performed at a starting portion of a corresponding field;
increasing a digital gain of images shot with the long shutter speed;
reducing a digital gain of images shot with a short shutter speed;
synthesizing long and short shutter speed images into a final image; and
outputting the final image.

6. The method according to claim 5, the step of synthesizing comprising:
synthesizing a short shutter speed image of one field with a long shutter speed image of a previous field.

7. The method according to claim 5, wherein the steps of increasing and reducing are selectively performed in response to a user input.

8. The method according to claim 5, wherein the photographing device comprises a CCD or a CMOS device.

9. A method for correcting the backlight of a camera having a shutter configured to operate in a backlight shooting mode, comprising:
varying a speed of the shutter over a plurality of fields so that a long shutter speed operation and a short shutter speed operation are performed once respectively per field, the short shutter speed operation being performed at an end portion of a corresponding field;
increasing a digital gain for images shot with the long shutter speed;
decreasing a digital gain for images shot with the short shutter speed;
synthesizing long and short shutter speed images into a final image; and
outputting the final image.

10. The method according to claim 9, the step of synthesizing comprising:
synthesizing a short shutter speed image of one field with a long shutter speed image of a subsequent field.

11. The method according to claim 9, wherein the steps of increasing and reducing are selectively performed in response to a user input.

12. The method according to claim 9, wherein the camera comprises a CCD or a CMOS device.

13. A method for correcting the backlight of a camera having a shutter configured to operate in a backlight shooting mode, comprising:
varying a speed of the shutter over a plurality of fields so that a long shutter speed operation is performed once and a short shutter speed operation is performed twice respectively per field;
increasing a digital gain for images shot with the long shutter speed;
decreasing a digital gain for images shot with the short shutter speed;
synthesizing long and short shutter speed images into final images; and
outputting the final images.

14. The method according to claim 13, the step of varying comprising:
varying the speed of the shutter over the plurality of fields so that the short shutter speed operation is performed at a start portion and an end portion of a respective field.

15. The method according to claim 14, the step of synthesizing comprising:
synthesizing a long shutter speed image of a cycle with a short shutter speed image of a start portion of the cycle to produce a first final image; and
synthesizing the long shutter speed image of the cycle with a short shutter speed image of an end portion of the cycle to produce a second final image.

16. The method according to claim 13, wherein the steps of increasing and reducing are selectively performed in response to a user input.

17. The method according to claim 13, wherein the camera comprises a CCD or a CMOS device.

18. An apparatus for correcting the backlight of a camera, comprising:
a shutter;
a controller configured to vary a speed of the shutter between a long shutter speed and a short shutter speed; and
a signal processor configured to synthesize an image shot with the long shutter speed with an image shot with the short shutter speed to produce a final image by increasing a digital gain on the image shot with the long shutter speed and reducing a digital gain on the image shot with the short shutter speed, and to output the final image.

19. The apparatus according to claim 18, wherein
the controller is configured to vary the shutter speed so that the long shutter speed image and the short shutter speed image are shot at least once in a cycle of one field.

20. The apparatus according to claim 18, wherein the signal processor is configured to increase or reduce the digital gain in response to a user input.

21. The apparatus according to claim 18, further comprising one of a CCD or CMOS.

22. An apparatus for correcting the backlight of a camera, comprising:
a shutter;
a controller configured to vary a speed of the shutter over a plurality of fields so that a long shutter speed operation and a short shutter speed operation are performed once respectively per field, the short shutter speed operation being performed at a start portion of a corresponding field; and
a signal processor configured to
increase a digital gain of images shot with the long shutter speed;
reduce a digital gain of images shot with a short shutter speed;
synthesize long and short shutter speed images into a final image; and
output the final image.

23. The apparatus according to claim 22, wherein the signal processor is configured to synthesize a short shutter speed image of one field with a long shutter speed image of a previous field.

24. The apparatus according to claim 22, wherein the signal processor is configured to increase or reduce the digital gain in response to a user input.

25. The apparatus according to claim 22, further comprising one of a CCD or CMOS.

26. An apparatus for correcting the backlight of a camera, comprising:
- a shutter;
- a controller configured to vary a speed of the shutter over a plurality of fields so that a long shutter speed operation and a short shutter speed operation are performed once respectively per field, the short shutter speed operation being performed at an end portion of a corresponding field; and
- a signal processor configured to
  - increase a digital gain of images shot with the long shutter speed;
  - reduce a digital gain of images shot with a short shutter speed;
  - synthesize long and short shutter speed images into a final image; and
  - output the final image.

27. The apparatus according to claim 26, wherein the signal processor is configured to synthesize a short shutter speed image of one field with a long shutter speed image of a subsequent field.

28. The apparatus according to claim 26, wherein the signal processor is configured to increase or reduce the digital gain in response to a user input.

29. The apparatus according to claim 26, further comprising one of a CCD or CMOS.

30. An apparatus for correcting the backlight of a camera, comprising:
- a shutter;
- a controller configured to vary a speed of the shutter over a plurality of fields so that a long shutter speed operation is performed once and a short shutter speed operation is performed twice respectively per field; and
- a signal processor configured to
  - increase a digital gain for images shot with the long shutter speed;
  - decrease a digital gain for images shot with the short shutter speed;
  - synthesize long and short shutter speed images into final images; and
  - output the final images.

31. The apparatus according to claim 30, wherein the controller is configured to vary the speed of the shutter over the plurality of fields so that the short shutter speed operation is performed at a start portion and an end portion of a respective field.

32. The apparatus according to claim 30, wherein the signal processor is configured to
- synthesize a long shutter speed image of a cycle with a short shutter speed image of a start portion of the cycle to produce a first final image; and
- synthesize the long shutter speed image of the cycle with a short shutter speed image of an end portion of the cycle to produce a second final image.

33. The apparatus according to claim 30, wherein the signal processor is configured to increase or reduce the digital gain in response to a user input.

34. The apparatus according to claim 30, further comprising one of a CCD or CMOS.

* * * * *